(12) United States Patent
Ravat et al.

(10) Patent No.: US 9,539,737 B2
(45) Date of Patent: Jan. 10, 2017

(54) METHOD AND DEVICE FOR MEASURING THE PLY ANGLE PRIOR TO CUTTING (75) Inventors: Stéphane Ravat, Saint Genes Champanelle (FR); Thierry Ducros, Ceyrat (FR); Clément Dubois, Clermont-Ferrand (FR)

(73) Assignees: COMPAGNIE GENERALE DES ESTABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 640 days.

(21) Appl. No.: 13/519,124

(22) PCT Filed: Dec. 7, 2010

(86) PCT No.: PCT/EP2010/069075
§ 371 (c)(1),
(2), (4) Date: Sep. 21, 2012

(87) PCT Pub. No.: WO2011/076558
PCT Pub. Date: Jun. 30, 2011

(65) Prior Publication Data
US 2013/0199349 A1 Aug. 8, 2013

(30) Foreign Application Priority Data
Dec. 24, 2009 (FR) ...................................... 09 59565

(51) Int. Cl.
*B26D 7/26* (2006.01)
*B29D 30/46* (2006.01)
*B26D 1/14* (2006.01)

(52) U.S. Cl.
CPC ............. *B26D 7/2635* (2013.01); *B26D 1/141* (2013.01); *B29D 30/46* (2013.01);
(Continued)

(58) Field of Classification Search
CPC ........... B26D 7/00; B26D 7/0006; B26D 7/26; B26D 7/2628; B26D 7/2635; B26D 1/12; B26D 1/141; B26D 3/003; B26D 1/14
(Continued)

(56) References Cited

U.S. PATENT DOCUMENTS 1,505,367 A * 8/1924 Biersdorf ............... B26D 1/065
83/471.2
3,164,046 A * 1/1965 Arnaud ................. C03B 33/027
33/32.1
(Continued)

FOREIGN PATENT DOCUMENTS

EP 0 447 273 9/1991
JP 3 251440 11/1991
(Continued)

Primary Examiner — Jason Daniel Prone
Assistant Examiner — Richard Crosby, Jr.
(74) Attorney, Agent, or Firm — Cozen O'Connor (57) ABSTRACT

Cutting device for cutting a reinforcing ply (N) formed of a set of portions of thread, of given length, coated in a rubber compound, laid parallel to one another and making a given theoretical angle (a) with the longitudinal direction of the ply, characterized in that it includes a first element able, without proceeding to cut the said ply (N), to estimate the actual angle of the threads with the longitudinal direction (XX') of the device and a second element able to cut the ply (N) at the actual angle (a+da) estimated by the first element.

14 Claims, 5 Drawing Sheets (52) U.S. Cl.
CPC ..... *B29D 2030/466* (2013.01); *Y10T 83/0405* (2015.04); *Y10T 83/538* (2015.04)

(58) Field of Classification Search
USPC .................. 83/614, 56, 522.19, 522.21, 821
See application file for complete search history.

(56) References Cited

U.S. PATENT DOCUMENTS

| | | | | |
|---|---|---|---|---|
| 3,406,601 | A * | 10/1968 | Clifford | G01B 21/06 318/603 |
| 4,156,378 | A * | 5/1979 | Felten | B26F 3/04 83/482 |
| 4,358,975 | A * | 11/1982 | Higgins | B26D 1/185 83/471.2 |
| 4,383,460 | A * | 5/1983 | Schotter et al. | C03B 33/10 30/164.95 |
| 4,411,182 | A * | 10/1983 | Borzym | 83/319 |
| 4,572,046 | A * | 2/1986 | Still et al. | 83/171 |
| 4,784,030 | A * | 11/1988 | Waring | 83/105 |
| 4,857,123 | A * | 8/1989 | Still et al. | 156/133 |
| 4,860,620 | A * | 8/1989 | Pizzorno | 83/156 |
| 4,965,733 | A * | 10/1990 | Kimura et al. | 700/167 |
| 5,253,558 | A * | 10/1993 | Guddal, Jr. | 83/18 |
| 5,327,353 | A * | 7/1994 | Nagano | 700/167 |
| 5,882,457 | A * | 3/1999 | Currie et al. | B29D 30/3007 156/128.1 |
| 6,647,843 | B1 * | 11/2003 | Takasaki et al. | 83/72 |
| 6,899,778 | B1 * | 5/2005 | Gridley et al. | B29D 30/54 156/110.1 |
| 6,928,911 | B1 * | 8/2005 | Ratkus et al. | B26D 1/0006 83/171 |
| 7,392,732 | B2 * | 7/2008 | Lindsey, Jr. et al. | B26D 3/085 257/E21.599 |
| 8,196,793 | B2 * | 6/2012 | Ohmura et al. | B26F 3/002 225/103 |
| 8,357,254 | B2 * | 1/2013 | Cerny | B60C 11/12 156/128.6 |
| 8,677,871 | B2 * | 3/2014 | Van Laar et al. | 83/76.8 |
| 2006/0137500 | A1 * | 6/2006 | Downing | 83/56 |

FOREIGN PATENT DOCUMENTS

JP  2004 082392  3/2004
WO  WO 2005087481 A2 *  9/2005

* cited by examiner

METHOD AND DEVICE FOR MEASURING THE PLY ANGLE PRIOR TO CUTTING

RELATED APPLICATIONS

This is a U.S. National Phase Application under 35 USC 371 of International Application PCT/EP2010/069075 filed on Dec. 7, 2010.

This application claims the priority of French Application No. 09/59565 filed Dec. 24, 2009, the entire content of which is hereby incorporated by reference.

FIELD OF THE INVENTION

The invention relates to the field of tire manufacture, and more particularly to the field of processing and cutting the reinforcing plies upstream of the tire-building process.

BACKGROUND OF THE INVENTION

These reinforcing plies come in the form of a set of portions of thread, of given length, coated in a rubber compound, laid parallel to one another and making a given angle with the longitudinal direction of the ply.

During the tire-building operation it is necessary to cut portions of ply the length of which is tailored to the circumference of the form intended to accept this component. Hence, upstream of the tire-building machine, there is a cutting means able to separate a portion of ply off from the continuous strip of ply, by cutting through the bridge of rubber compound between two adjacent threads.

As a general rule, this cutting means moves along a straight support the orientation of which corresponds to a theoretical angle formed by the threads with the longitudinal direction.

However, it is found to be the case that the actual angle of the threads with the longitudinal direction differs by one or two degrees of angle from the theoretical angle that the creation of the ply sought to achieve.

It therefore follows that the cutting means penetrating the space between two threads and following a path corresponding to the theoretical angle strikes the threads transversely and causes the ply to become deformed or damaged.

Hence, cutters known as floating cutters have been developed, these being supported by an articulated frame and able to move freely in a direction perpendicular to the direction for support. The threads adjacent to the cutting line are then used to guide the cutter transversely to its direction of travel. This device is described by way of example in publication U.S. Pat. No. 4,857,123.

Alternatively, publication JP 3 251 440 describes a device comprising a measurement unit formed of magnetic means to control the transverse deviation of the cutter, but this means is suited only to plies formed of metal reinforcing threads.

However, where there is a desire to cut plies containing threads of small diameter and low rigidity, it is found that the threads no longer act as guides because of their poor mechanical integrity. Indeed, for the device known from the prior art to work correctly, it is necessary for the threads to be able to withstand the transverse force needed to cause the transverse movement of the cutting means. Further, it is found that the greater the force applied to the cutter in order for it to be capable of producing the desired effect, namely of cutting the ply, the greater this transverse force becomes. This phenomenon is particularly keenly felt when the cutting means is cutting through the two transverse ends of the ply, and lifting or folding of the ply in this region is not uncommon.

SUMMARY OF THE INVENTION

It is an object of the invention to provide a solution to this problem.

The device for cutting a reinforcing ply according to an embodiment of the invention is characterized in that it comprises a first means able, without proceeding to cut the said ply, to estimate the actual angle of the threads with the longitudinal direction and a second means able to cut the ply at the angle estimated by the first means.

The method according to an embodiment of the invention draws upon the functionalities of the abovementioned device and comprises the following steps during which:

the said ply is unrolled under the first means, the actual angle of the threads with the longitudinal direction is determined using the first means, the second means is oriented as a function of the actual angle estimated by the first means, and a portion of ply is cut.

It is therefore possible to cut the ply while minimizing the transverse forces applied by the threads to the cutting wheel. Hence another object of the invention is to provide alternative embodiments of the said first means that allow the actual angle to be measured while at the same time causing the ply to undergo the minimum of deformation.

BRIEF DESCRIPTION OF THE DRAWINGS

The following description is supported by FIGS. 1 to 9 in which.

DETAILED DESCRIPTION OF THE DRAWINGS

Figure 1:
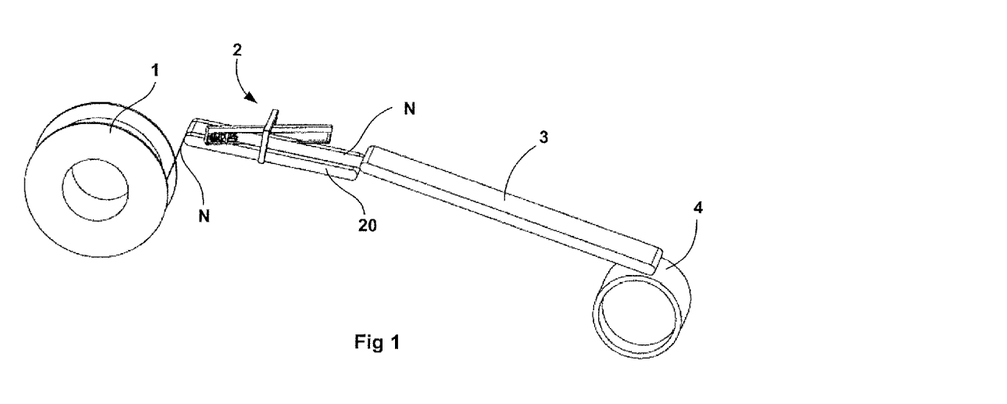
FIG. 1 is an overview of a tire-building means comprising a cutting device according to an embodiment of the invention.

The tire-building means described in FIG. 1 comprises a supply wheel 1 on which is stored a continuous strip of reinforcing ply N. This ply is unwound onto a cutting device 2 according to the invention, where the continuous strip is cut into portions of given length. This cutting device comprises a transfer belt 20 on which the said ply N runs towards a storage or transfer belt 3 onto which the portion of ply is discharged to await the laying of the said portion on a tire building drum 4. The plane of the transfer belt on which the ply rests, which is generally arranged horizontally, is the plane of reference for the cutting device 2.

Figure 2:
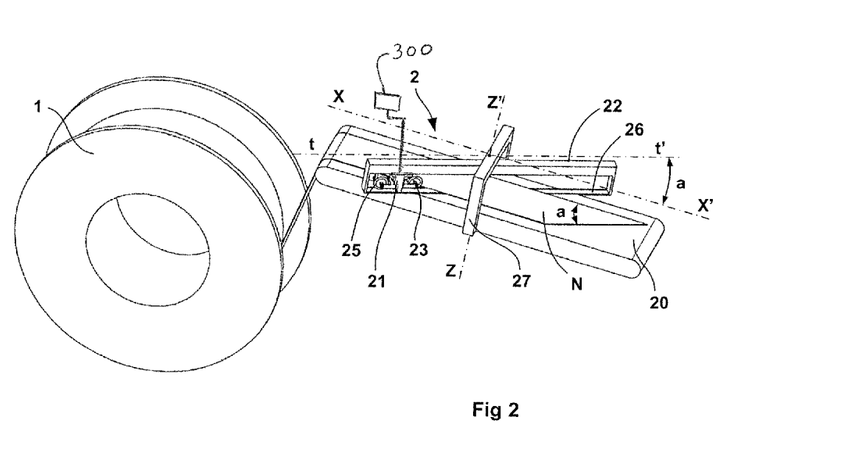
FIG. 2 is a perspective overview of a cutting device according to an embodiment of the invention.

The cutting device comprises, with reference to FIG. 2, a supporting structure 27 supporting a straight rail 22. The rail pivots about an axis parallel to the direction ZZ' perpendicular to the plane of the belt 20 on which the ply N rests.

The threads of the ply make a theoretical angle a with the longitudinal direction of the ply and of the belt XX'. For the method to run smoothly, it is clearly contrived for the longitudinal direction of the ply and of the continuous strip to correspond very closely to the longitudinal direction XX' of the cutting device. Means (not depicted) allow the direction tt' of the rail 22 to be oriented to an angle substantially equal to the angle of the threads with respect to the longitudinal direction XX'.

A mobile support 21 runs along the rail 22 and supports the first means 23 and the second means 25. The second means 25 may comprise a cutting wheel which presses onto an anvil 26.

Figure 3:
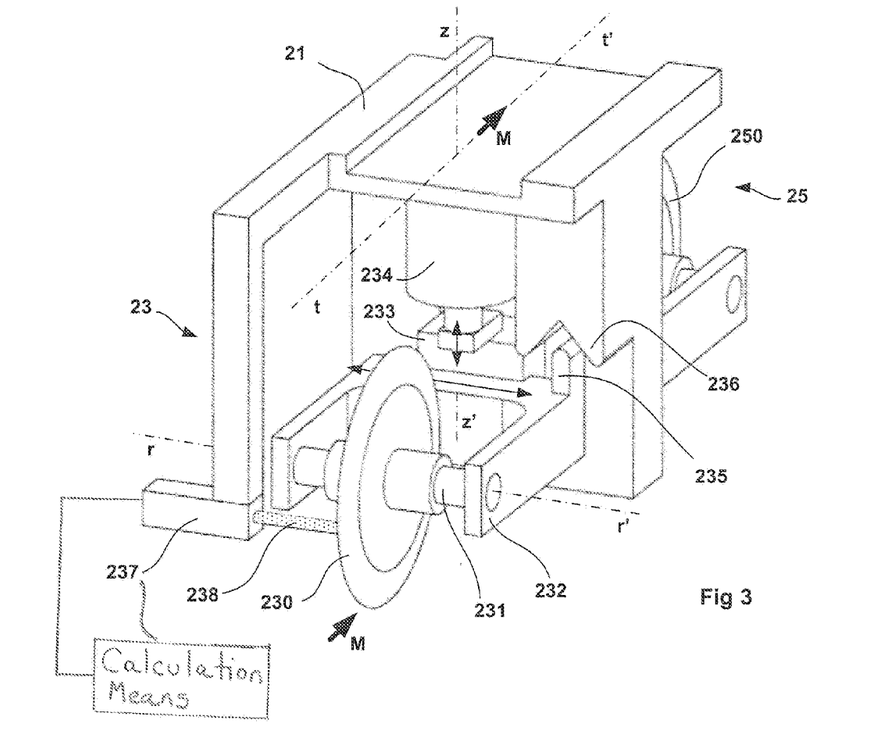
FIG. 3 is a perspective view of a first means according to a further embodiment.

FIG. 2 depicts a first embodiment of the first means 23, which comprises a measurement wheel 230, able to follow the groove S formed by the space between two mutually juxtaposed reinforcing threads as the support 21 moves along the said rail 22 as has been illustrated in FIG. 3.

The measurement wheel 230 is free to rotate about an axle 231 on which the orientation rr' is substantially perpendicular to the plane formed by the direction tt' of the rail 22 and by the direction ZZ' perpendicular to the plane of the ply N and of the belt 20.

The axle 231 of the wheel 230 is connected to the mobile support 21 via a rigid frame 232. This frame is able to move freely in a direction parallel to the direction rr' of the said axle 231. For this purpose, the frame 232 runs freely in a guideway 233.

Figure 4:
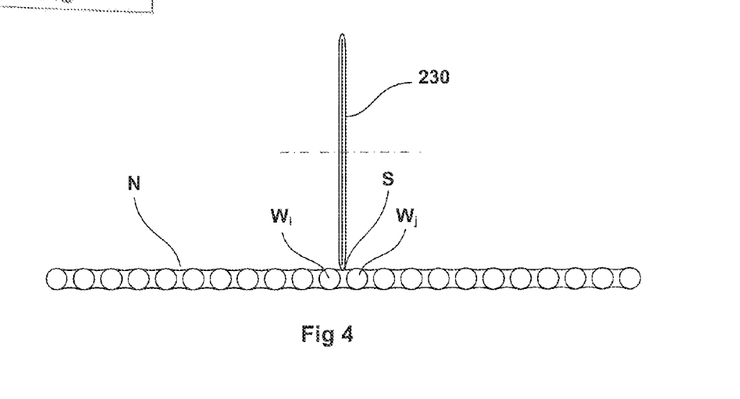
FIG. 4 is a detailed view of the way of applying the first means to the reinforcing ply.

The guideway 233 is itself driven up and down in the direction ZZ' by an actuating cylinder 234. This movement allows the wheel to be pressed lightly against the surface of the ply so that the wheel can run along the groove S without severing the bridge of rubber formed between the two threads $W_i$ and $W_j$ as illustrated in FIG. 4, and without deforming the angle of the threads.

To achieve this result, the first application force $F_1$ with which the wheel is applied to the ply N can beneficially be between 1 daN and 5 daN. These limits are derived from acquired experience, during the course of which it was notices that:
  when the application force is too high, the measurement wheel is liable to dig into the bridge of rubber and alter the actual orientation of the threads,
  when the application force is too low, the measurement wheel may leave the groove S.

In the known way, and in order to avoid divergent paths of the measurement wheel 230, steps are taken to ensure that the measurements are taken by running the support 21 in the direction that allows the components that form the assembly subjected to the reaction of the wheel in the direction tt' to be placed under tension. This direction of running is identified by the arrow M.

In that way, as the support 21 moves along the rail 22, the transverse forces generated by the edges of the groove S, and which the method seeks to make as low as possible, are transmitted by the wheel 230 and cause the rigid frame 232 to move in the guideway 233 in the direction rr'.

Means 300, of the pulse coder type, allow the movement of the support 21 along the rail 22 to be measured.

Likewise, means are provided for measuring the movement of the wheel in the direction parallel to the direction rr' of the axle 231. By way of indication, these means may be formed of a laser beam 238 oriented in the direction substantially perpendicular to the plane of the wheel 230 and of a telemetry transmitter/receiver station 237.

A guide 236, mounted on the support 21, collaborating with a spigot 235 mounted on the rigid frame 235 may then beneficially be added to the first measurement means in order to keep the wheel 230 centred with respect to the support when the guideway 233 supporting the frame 232 is raised at the end of the measurement cycle.

It will be noted that the first means can be embodied using means distinctly different from those which form the subject matter of the present description. For information, equivalent results can be obtained using a sensor mounted on a support, instead of the wheel, or even using optical detectors which, although they are more expensive and complicated to implement, offer the advantage of not interacting mechanically with the threads of the ply.

Figure 5:
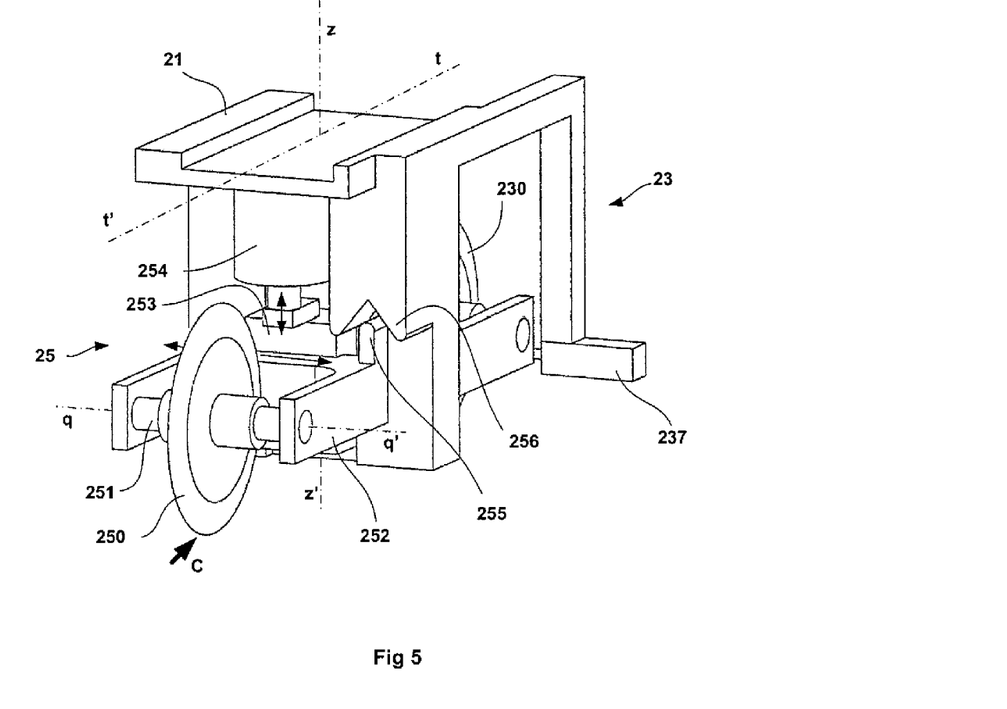
FIG. 5 is a perspective view of the second means according to the said further embodiment.

The second cutting means 25 for its part is of a known style. FIG. 5 illustrates the main components thereof.

According to the embodiment depicted, this second means comprises a cutting wheel 250 mounted on an axle 251 of which the direction qq' is perpendicular to the plane formed by the direction tt' of the rail 22 and by the directions ZZ' perpendicular to the plane of the ply N. The axle 251 is connected to the support 21 by a rigid frame 252.

For preference, this rigid frame 252 may itself be mounted in a guideway 253 so that the frame 252 can run freely in a direction parallel to the direction qq' of the axle 251.

Centring means 255 and 256, identical to those described previously, are also provided.

The guideway 253 is driven up and down in the direction ZZ' by an actuating cylinder 254. This actuating cylinder allows the cutting wheel 250 to be applied to the ply N, which is resting on the anvil 26, with a force $F_2$ the amplitude of which may beneficially be between 50 daN and 90 daN. To improve cutting efficiency, it is possible to raise the cutting wheel 250 to a regulated temperature of the order of 140° C.

In the same way as was mentioned before, and still with the objective of avoiding divergent paths of the cutting wheel 250, steps are taken to ensure that measurements are taken by running the support 21 in the direction that allows the components that form the assembly subjected to the reaction of the cutting wheel 250 in the direction tt' to be placed under tension. This direction of running is identified by the arrow C.

FIGS. 5 to 9 describe a second embodiment of the first measurement means.

Figure 6:
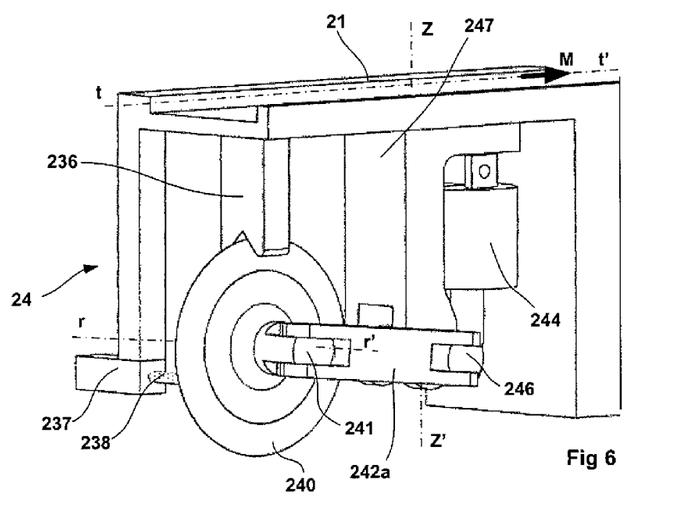
FIGS. 6 and 7 are perspective views of the first means according to another embodiment of the invention.
Figure 7:
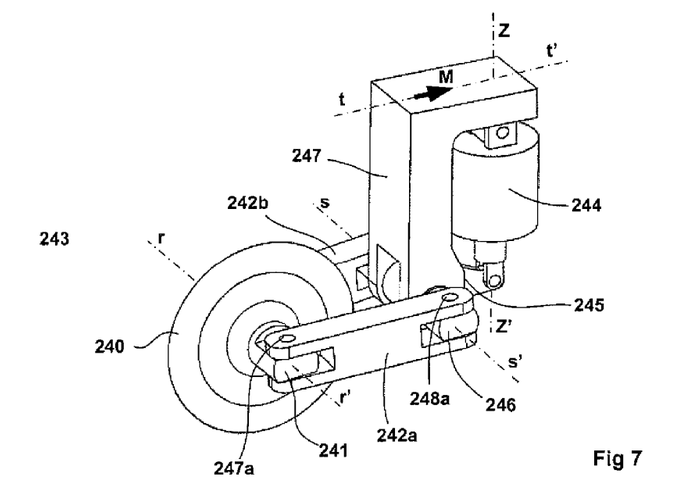

According to this second embodiment, the first means comprises a measurement wheel 240 rotating freely on an axle 241 of which the orientation rr' is substantially perpendicular to the plane formed by the direction tt' of the support 21 and by the direction ZZ' perpendicular to the plane of the ply N and of the belt 20.

The axle 241 of the measurement wheel 240 is connected to the support 21 via an articulated frame comprising two link rods 242a and 242b each connected, by articulations 247a, 247b, 248a, 248b, on the one hand to the two ends of an axle 246 secured to the support 247, of which axle the direction ss' is parallel to the direction rr' of the axle 241, and on the other hand to the two ends of the axle 241 of the measurement wheel 240.

The link rod axles 247a, 247b, 248a, 248b respectively, are substantially parallel to the direction ZZ', such that movement of the measurement wheel 240 in the direction rr' is accompanied by a pivoting of the link rods about the joints 247a, 247b, 248a, 248b.

The application force $F_1$ with which the wheel is applied to the ply comes from the action of an actuating cylinder 244 on an arm 245 fixed to the axle 246.

When the link rods 242a and 242b are parallel, the plane of the wheel 240 remains perpendicular to the direction rr' and substantially parallel to the direction tt' of the rail 22.

Figure 8:
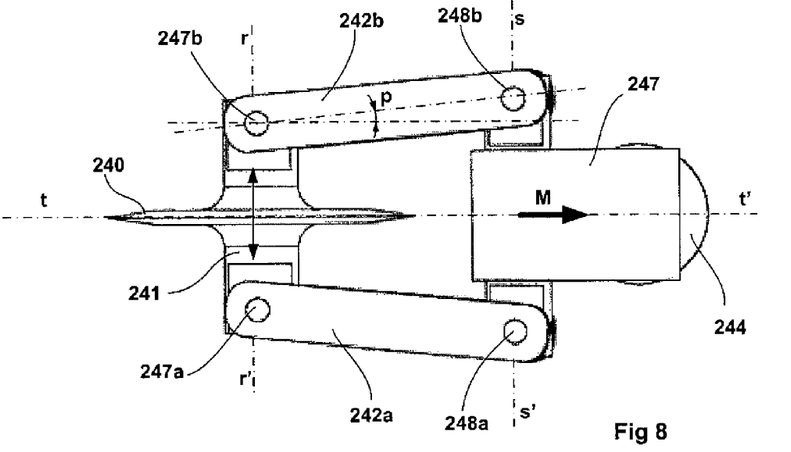
FIGS. 8 and 9 are views from above of one particular way of setting up the other embodiment of the invention.
Figure 9:
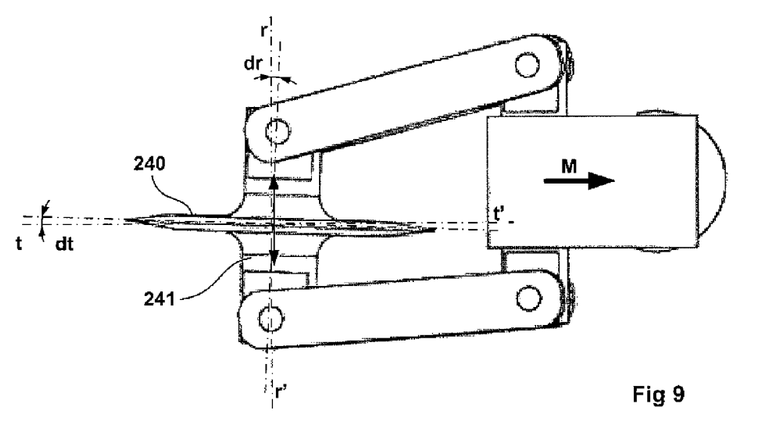

FIGS. 8 and 9 illustrate one possible improvement to this second embodiment of the first means. It will be noted that the link rods 242a and 242b are not mutually parallel and are mounted with a "toe-in" angle p with respect to the direction tt'.

The result of this is that the movement of the measurement wheel 240 in a direction rr' substantially perpendicular to the plane formed by the direction (tt') of the rail 22 and by the direction ZZ' perpendicular to the plane of the ply N, causes the plane of the measurement wheel 240 to experience a slight rotation dt with respect to the direction (tt') of the rail 22.

Steps are therefore taken to ensure that the angle dt corresponds, as far as possible, to the mean angular deviation da observed on the plies commonly processed using the device. This slight deviation of the plane of the measurement wheel makes it possible to achieve a corresponding reduction in the extent to which the wheel attacks the threads $W_i$ and $W_j$ bordering the measurement groove S and a weakening of the application force $F_1$ generated by the actuating cylinder 244.

Implementation of a device according to one or other of the embodiments described hereinabove involves the following steps:
- the said ply N is unrolled under the first means 2,
- the rail 22 is oriented in such a way that the direction tt' of the rail 22 makes an angle with the longitudinal direction XX' of the device that corresponds to the theoretical angle a of the threads with respect to the longitudinal direction XX' of the ply,
- the mean angular discrepancy da between the theoretical direction a of the threads and the actual direction of the threads with the longitudinal direction XX' is determined, by simple trigonometric calculation by a machine that calculates, using the first means by running the wheel 230, 240 along a groove S formed by the space between two mutually juxtaposed reinforcing threads $W_1$ and $W_3$ and by measuring the transverse movement of the wheel in the direction rr' and the longitudinal movement of the support along the rail 22,
- the rail (22) is oriented in such a way that the direction (tt') of the rail (22) makes an angle corresponding to the actual angle a+da of the threads with respect to the longitudinal direction of the ply,
- and a portion of ply is cut using the second means.

It would be entirely possible to orient the direction of the rail during cutting such that the cutting angle is precisely the angle recorded by the measurement wheel at each stage in the progression of the support 21 along the rail 22.

However, it would seem that such an arrangement is cumbersome to implement and that the threads have a generally straight orientation so that such refinements are unnecessary. It is therefore enough to calculate the mean angular discrepancy da of the thread with respect to the longitudinal direction in order to determine an angular correction that will allow a cut of entirely satisfactory quality to be made.

Use of the second means to cut the ply can be made directly in the groove used to guide the measurement wheel. It will then be seen that the measurement cycle and the cutting cycle are performed consecutively while the ply is simultaneously unwound onto the belt 20 and onto the launch belt 3. This means that, during this technology period, both the belt 20 of the cutting device 2 and the launch belt 3 are immobilized.

It may therefore seem sensible for the actual angle to be measured not in real time, prior to the unwinding of the ply onto the launch belt 3, it being pointed out that the angular discrepancies da do not vary suddenly between two points on the ply which are closely spaced in the longitudinal direction.

In that case, the angle is measured using the first means at the start of the ply before the said start is fed onto the launch belt 3, upstream of the point at which cutting is performed using the second means. The cutting of the ply is begun after the length needed to create the portion of ply has been unwound which then simultaneously occupies the belt 20 and the transfer belt 3. This feed phase is then relieved of the technology period required to evaluate the actual angle using the first means.

In the exemplary embodiments of the invention that form the subject matter of this description, the first and second means are mounted on the same support 21 and run on the same rail 22. However, it is also possible to implement the invention using separate means mounted on separate rails and separate supports.

Likewise, it will be noted that the characteristics of the first and of the second means may be very similar to one another. Therefore it is entirely possible for the invention to be implemented using the same wheel to measure and to cut in succession.

Steps are then taken to ensure that the application actuating cylinder is capable of applying the wheel to the ply by successively applying a first application force $F_1$ and a second application force $F_2$ of different values, when the wheel is successively in the measurement position and then in the cutting position. In that case, the precaution of reducing the temperature to which the wheel is heated will be adopted so as not to degrade the bridge of rubber that forms the measurement groove S.

The invention claimed is:

1. A cutting device for cutting a reinforcing ply formed of a set of portions of thread, of given length, coated in a rubber compound, laid parallel to one another and making a given theoretical angle with a longitudinal direction of the ply, comprising:
   a first means able, without proceeding to cut the ply, to apply a first force and to estimate an actual angle of the threads with a longitudinal direction of the device, comprising a measurement wheel, mounted on a mobile support running on a straight rail, with a direction of the rail being orientable to a given angle with the longitudinal direction of the device, and able to follow a groove formed by a space between two mutually juxtaposed reinforcing threads when the support moves along the rail, and of which an axle, oriented substantially in a direction perpendicular to a plane formed by the direction of the rail and by the direction perpendicular to the plane of the ply, is free to move in said direction of the axle, and
   a second means able to apply a second force that is greater than the first force and to cut the ply at the actual angle estimated by the first means;
   wherein the first means further comprises;
   assessing means for assessing the distance covered by the support of the said wheel along the rail,
   assessment means for assessing the movement of the said wheel in the direction parallel to the direction of the axle, and calculation means able to determine a mean actual angle of the threads with the longitudinal direction.

2. The device according to claim 1, wherein the first means comprises application means able, when the device is in operation, to apply the measurement wheel to the surface of the ply with the first force.

3. The device according to claim 2, wherein the application means are able to apply the first force of between 1 daN and 5 daN to apply the measurement wheel to the ply.

4. The device according to claim 1, wherein the axle of the measurement wheel is connected to the mobile support via a rigid frame able to move freely in a direction parallel to the direction of the axle of the measurement wheel.

5. The device according to claim 1, wherein the axle of the measurement wheel is connected to the support via an articulated frame comprising:
a support axle secured to the support that is parallel to the axle of the measurement wheel;
two link rods each having articulations at their respective ends, the respective articulations at a first one of the respective ends of the two link rods connected to respective ends of the support axle, and the respective articulations at a second one of the respective ends of the two link rods connected to the two ends of the axle of the measurement wheel.

6. The device according to claim 5, wherein the two link rods are mounted with "toe-in" at an angle with respect to the direction of the rail, so that movement of the measurement wheel in a direction perpendicular to the plane formed by the direction of the rail and by the direction perpendicular to the plane of the ply causes the plane of the measurement wheel to rotate by dt with respect to the direction of the rail.

7. The device according to claim 1, wherein the second means comprises:
a straight rail orientable at a given angle with the longitudinal direction of the device;
a cutting wheel, mounted on a mobile support running along the rail, with an axis of the cutting wheel being oriented substantially in a direction perpendicular to the plane formed by the direction of the rail and by the direction perpendicular to the plane of the ply, and able to cut through the bridge of rubber separating two mutually juxtaposed portions of thread, and
application means able, when the device is in operation, to apply said cutting wheel to the surface of the said ply with the second force.

8. The device according to claim 7, wherein the axle of the cutting wheel is also free to move in the direction perpendicular to the plane formed by the direction of the rail and by the direction perpendicular to the plane of the ply.

9. The device according to claim 7, wherein application means are able to apply said cutting wheel to the surface of the ply with a second application force of between 50 daN and 90 daN.

10. The device according to claim 2, wherein the first means and the second means are positioned on the mobile support on the straight rail.

11. The device according to claim 10, wherein the measurement wheel and the cutting wheel coincide with each other, and wherein the application means is configured to apply the measurement wheel and the cutting wheel to the surface of the ply with a first application force and a second application force in succession.

12. A method for cutting a reinforcing ply formed of a set of portions of thread, of given length, coated in a rubber compound, laid parallel to one another and making the given angle with a longitudinal direction of the ply, using a device according to claim 10, comprising the following steps during which:
unrolling the ply is under the first means;
orienting the rail supporting the first means such that the rail makes an angle with the longitudinal direction of the device that corresponds to a theoretical angle of the threads with respect to the longitudinal direction of the ply;
determining a mean angular discrepancy between the theoretical direction of the threads and the actual direction of the threads with the longitudinal direction using the first means by running the measurement wheel along a groove formed by the space between two mutually juxtaposed reinforcing threads;
orienting the rail supporting the second means such that the rail makes an angle with the longitudinal direction of the device corresponding to the actual angle of the threads with respect to the longitudinal direction of the ply; and
cutting a portion of ply using the cutting wheel of the second means.

13. The method according to claim 12, further comprising:
cutting the ply using the second means along the groove used to guide the measurement wheel when evaluating the angular discrepancy using the first means.

14. The method according to claim 12, further comprising:
cutting the ply using the second means downstream, in the direction in which the ply is unrolled, of the groove that was used to measure the angular discrepancy using the first means.

* * * * *